July 21, 1925.
J. SWANSON
SPOTLIGHT
Filed June 4, 1924
1,547,081
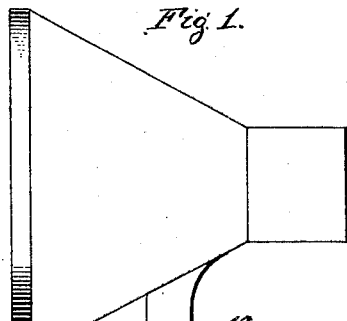
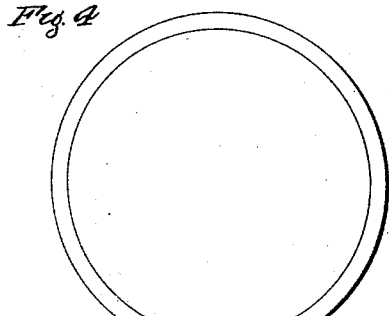
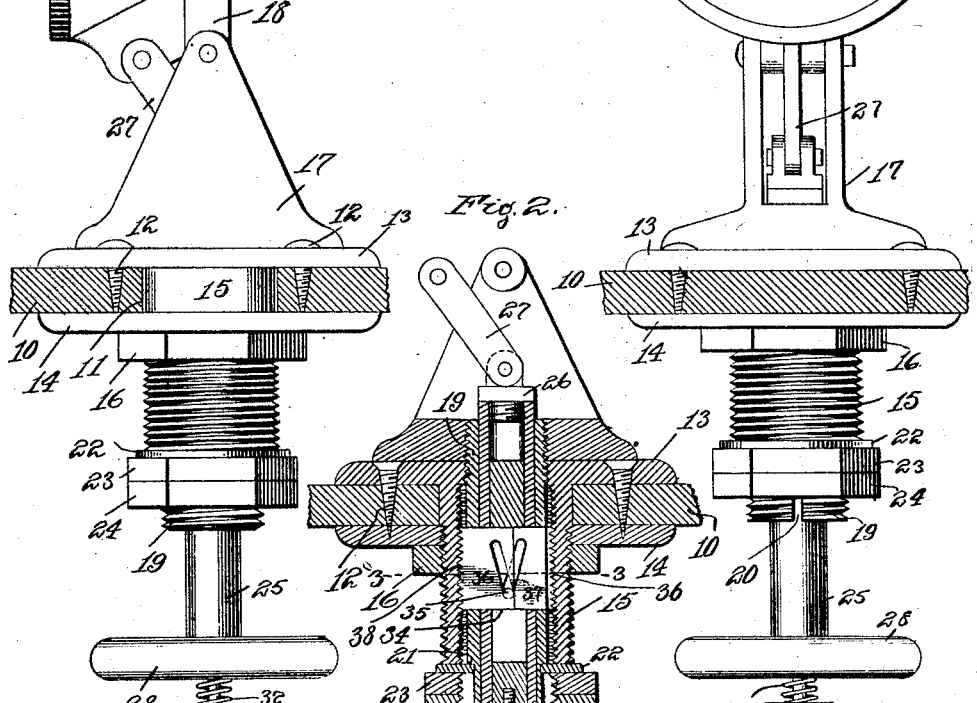
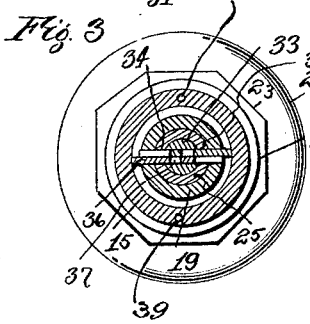
Inventor
John Swanson.
By
Attorney Patented July 21, 1925.

1,547,081

UNITED STATES PATENT OFFICE.

JOHN SWANSON, OF FORT WAYNE, INDIANA.

SPOTLIGHT.

Application filed June 4, 1924. Serial No. 717,818.

*To all whom it may concern:*

Be it known that I, JOHN SWANSON, a citizen of the United States, residing at Fort Wayne, in the county of Allen, State of Indiana, have invented certain new and useful Improvements in Spotlights; and I do hereby declare the following to be a full, clear, and exact description of the invention, such as will enable others skilled in the art to which it appertains to make and use the same.

This invention relates to new and useful improvements in lighting devices, and particularly to spot lights used on automobiles.

One object of the invention is to provide a spot light device which is especially adapted for use in connection with closed automobiles, such as the sedan type.

Another object is to provide a spot light which is adapted to be mounted on the roof of the automobile, and which may be controlled from within the car, whereby to swing the lamp casing to shed its light in any vertical or horizontal direction.

Other objects and advantages will be apparent from the following description when taken in connection with the accompanying drawings.

In the drawings:

Figure 1 is a side elevation of the spot light, the roof of the car being in section.

Figure 2 is a vertical longitudinal sectional view through the device, except for the lamp casing.

Figure 3 is a horizontal sectional view on the line 3—3 of Figure 2.

Figure 4 is a front elevation of the device, the roof of the car being in section.

Referring particularly to the accompanying drawings, 10 represents the roof of the body of an automobile of the sedan type, said roof having an opening 11, located at a point above the driver's seat. Disposed against the upper and lower faces of said top 10, and secured thereto by means of the screws 12, are the centrally apertured plates 13 and 14. Secured within the opening of the upper plate 13, and depending into the automobile, is an internally and externally threaded tube 15, a nut 16 being engaged on the tube, and against the lower plate, whereby to properly clamp the plates against the respective faces of the automobile roof.

Disposed on the upper face of the plate 13 is stand 17, the upper portion of which is bifurcated and has pivotally supported therein the spot light casing 18, said casing being arranged to swing in a vertical plane on said stand. Secured centrally within the bottom of the stand 17, and extending downwardly within the tube 15, is a tube 19, said tube being formed with the diametrically opposite and longitudinally extending slots 20. This tube 19 is externally threaded on its lower end portion, and engaged on said end, with the inwardly directed lugs 21 engaged in said slots 20, is a washer plate 22, nuts 23 and 24 being threaded on the tube and bearing against the washer plate, to press the latter against the lower end of the tube 15. Slidable and rotatable within the tube 19 is a slightly smaller tube 25, the upper end of which has a bifurcated lug 26 secured within its upper end, said lug being pivotally connected with the lower side of the lamp casing 18 by means of the link 27. The tube 25 extends, for a distance, below the lower end of the tube 19, and is terminally provided with a hand wheel 28, said end being open, as clearly seen in the sectional view Figure 2. Screwed into the lower end portion of the tube 25 is a centrally apertured disk 29, and slidable through this disk is a stem 30, which projects below the lower end of the tube 25, and is provided with a button or knob 31. A coil spring 32 encircles this stem, between the knob 31 and the disk 29, for yieldably maintaining the stem in lowered position. Secured to the upper end of the stem 30, and disposed in the tube 25, is a plunger 33, said plunger being formed with a longitudinally extending slot 34, transversely through which is disposed a pin 35. Disposed within this slot 34, and within the slots 20, are the flat plates 36, each of which is formed with a vertical oblique slot 37 through which the said pin 35 passes, the outer ends of said plates being formed with transverse grooves 38 arranged to engage with the internal threads of the tube 15. The action of the coil spring 32, in forcing the stem 30 downwardly, pulls the plunger with it, causing the pin 35 to ride in the slots 37, of the plates 36, so as to force the plates outwardly, and engage their grooves 38 with the internal threads of the tube 15, and thereby hold the tube 25 against vertical movement within the tube 19. The engagement of the plates 36 with the tube 15 also prevents rotation of the tubes 19 and 25.

Upon grasping the hand wheel 28, while at the same time pressing the stem 30 upwardly, the plates 36 will be withdrawn from engagement with the tube 15, whereupon the operator may push the tube 25 upwardly, or pull same downwardly, to cause the vertical tilting of the lamp casing 18, through the medium of the link 27, or he may turn the wheel and cause the lamp casing to rotate, together with the stand 17, and thus cause the lamp to direct its light rays in the direction desired. By this arrangement the lamp may be rotated to throw its light toward the front, side, or rear of the automobile. The last-named is of importance when backing in a dangerous place, and particularly where it is dark. Upon moving the tube 25 upwardly or downwardly to the desired degree, to cause the proper tilt to the lamp, the stem 30 is released, whereupon the spring 32 causes the stem to move downwardly, reengaging the plates 36 with the interior of the tube 15, and thereby holding the tube 25 at the adjusted elevation.

The tube 19 has a pair of longitudinally extending openings 39, through which are adapted to be passed, the electrical conduits, not shown.

What is claimed is:

1. A rotatable and slidable adjusting means comprising a stationary member, a member slidable and rotatable within the stationary member, a third member slidable in the second-named member, the said members having transversely alining openings, the interior of the stationary member being circularly grooved, members slidable in said openings into and out of engagement with the interior of the stationary member and being terminally grooved, and means on the said third member for moving said slidable members within said openings.

2. A rotatable and slidable adjusting means including a stationary hollow member having its interior circularly grooved, a tube slidable and rotatable within the stationary member, a stem slidable within the said tube, the hollow member, the tube, and the stem having transversely alined longitudinal slots, plates slidable transversely in said slots and having their outer ends transversely grooved for engagement with the grooved interior of the stationary member, and means on the said stem for moving the plates into and out of engagement with the stationary member.

3. A rotatable and slidable adjusting means including a stationary hollow member having its interior circularly grooved, a tube slidable and rotatable within the stationary member, a stem slidable within the tube, the stationary member, the tube, and the stem having transversely alined longitudinal slots, the slot of the stem being elongated longitudinally of the stem, plates slidable transversely in said slots and being terminally formed with transverse grooves for engagement with the grooves of the stationary member, said plates each having a longitudinal oblique slot, and a transverse pin extending through the slot of the stem and through the oblique slots of the plates.

In testimony whereof, I affix my signature, in the presence of two witnesses.

JOHN SWANSON.

Witnesses:
W. A. FOERSTER,
D. W. VALENTINE.